United States Patent
Mantell et al.

(10) Patent No.: US 6,972,857 B2
(45) Date of Patent: Dec. 6, 2005

(54) METHOD AND APPARATUS FOR CONTROLLING CONSUMABLE USE IN AN IMAGE-RENDERING DEVICE

(75) Inventors: David A. Mantell, Rochester, NY (US); Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 929 days.

(21) Appl. No.: 10/014,569

(22) Filed: Dec. 14, 2001

(65) Prior Publication Data

US 2002/0075501 A1    Jun. 20, 2002

Related U.S. Application Data

(63) Continuation-in-part of application No. 09/739,140, filed on Dec. 18, 2000.

(51) Int. Cl.[7] ............................ G06F 15/00; G06K 1/00
(52) U.S. Cl. .................. 358/1.14; 358/1.14; 358/1.16; 358/1.18; 358/1.9; 358/504
(58) Field of Search ........................ 358/1.14, 1.16, 358/1.18, 504, 1.9

(56) References Cited

U.S. PATENT DOCUMENTS

| | | | | |
|---|---|---|---|---|
| 5,406,315 A | * | 4/1995 | Allen et al. | 347/7 |
| 5,602,637 A | * | 2/1997 | Hara et al. | 399/223 |
| 5,636,032 A | * | 6/1997 | Springett | 358/296 |
| 6,236,817 B1 | * | 5/2001 | Kim | 399/53 |
| 6,527,366 B1 | * | 3/2003 | Byers et al. | 347/43 |
| 6,862,110 B2 | * | 3/2005 | Harrington | 358/1.9 |

* cited by examiner

Primary Examiner—David Moore
Assistant Examiner—Andrew Lam
(74) Attorney, Agent, or Firm—Mark Z. Dudley

(57) ABSTRACT

Method and apparatus for controlling consumable use in an image-rendering device. More particularly, the invention relates to a image-rendering device that facilitates the limitation of page costs of color documents by establishing a threshold cost limitation and controlling one or more colorant amounts to be used on the page to ensure that the cost limitation is met. An optional override mode may be provided, wherein a selected page or pages, or a complete document, would be rendered without implementation of the cost reduction feature.

35 Claims, 7 Drawing Sheets

METHOD AND APPARATUS FOR CONTROLLING CONSUMABLE USE IN AN IMAGE-RENDERING DEVICE

This application is a continuation-in-part of U.S. application Ser. No. 09/739,140, filed Dec. 18, 2000, the disclosure of which is totally incorporated by reference.

This invention relates to a method and apparatus for controlling use of consumables in an image-rendering device. More particularly, the invention relates to a system and technique that facilitates the limitation of page costs of color documents by establishing a threshold cost limitation and controlling the colorant amounts to be used on the page to ensure that the cost limitation is met.

Reduced use of consumable materials (or "consumables"), such as toner, ink, and fuser oil, typically offers a reduction in the cost of operating an image-rendering device. However, there are other reasons to reduce consumable use. A reduction in consumable use can extend the period between service visits or operator intervention. Decreased use of a consumable will make the task of replacement or replenishing of the consumable less frequent, and generates less waste, such as discarded packaging and containers. Also, the frequency of some fault modes, such as jams or machine contamination, have been observed to increase in an image rendering device that exhibits high levels of use of consumables. Accordingly, reducing consumable use can improve the long-term reliability of the entire system. For certain image-rendering devices, the speed of the system can decline as the demand for consumables increases. Reducing the consumption of such materials may provide faster average performance.

In particular, the cost of printing a page having color images thereon is typically more expensive than printing the same page in black and white. While the causes of this discrepancy may vary from system to system, the primary contributor to the increased cost of a color page is the higher cost of color materials (e.g. various color inks) as compared to the materials required (e.g. black ink) to print in black and white. The practical impact of the higher cost of printing color pages is that fewer color pages are printed. This, of course, has the disadvantage that many color images are not properly printed in color, as was intended. The generation of color images is sometimes discouraged or avoided altogether in document preparation, in order to avoid the associated increase in costs in printing or copying the document.

As such, it would be advantageous to have a system that could print pages that fall within a consumable use limit, such as a threshold cost constraint, but still allows the printing of pages to occur such that at least some amount of consumable material is used in printing the page.

The present invention contemplates a new method and apparatus for controlling consumable use in an image-rendering device. While the invention is particularly directed to the art of controlling cost for rendering color images on pages, and will be thus described with specific reference to colorants, it will be appreciated that the invention will have utility in controlling consumable use in general, and with application to other devices and situations. For example, the invention may be applied to any image-rendering situation where the consumption of one or more image-rendering materials is to be controlled.

Accordingly, a preferred embodiment of the image rendering system described herein may be considered to include a method or apparatus for controlling the use of one or more colorants having particular light-emitting, light-reflecting, or light-refracting characteristics, such as toners, inks, dyes, waxes, metals, plastics, phosphors, or similar materials, the consumption or costs of which are to be controlled.

Methods and systems for controlling consumable use in an image-rendering device will now be described. The systems provide a warranted mode that sets a limit on the use of the consumable. In the illustrated embodiments, the particular limit is applied to the cost of printing (e.g. on a per page basis). When operating in this mode, a printer, copier, or other image-rendering device ensures that the desired threshold cost for the printing of the pages is not exceeded. An optional override mode may be provided, wherein a selected page or pages, or a complete document, would be rendered without implementation of the feature for reduced consumable use described herein.

In certain embodiments it may be impractical or impossible to precisely determine the actual consumable use for a particular page. An approximation of the consumable use is believed to be sufficient, so that the reduction for a collection or ensemble of pages will provide the expected advantages of the invention.

In one aspect of the invention, a method for controlling cost in an image rendering device—wherein images rendered are represented in the device by color elements having color element specifications, the color elements each have associated therewith cost factors for printing dependent on particular associated colorants and amounts thereof and a threshold printing cost is set—comprises steps of providing a color image having color element specifications, determining one or more colorant amounts of the color image, calculating an actual printing cost for the image based on the one or more colorant amounts and the colorant dependant cost factors, determining whether the actual printing cost exceeds the threshold printing cost, reducing one or more colorant amounts to be used in printing if the actual printing cost exceeds the threshold printing cost and printing one of a modified color image based on the reducing and the color image.

In another aspect of the invention, an image rendering device—wherein images rendered are represented in the device by color element specifications, the color element specifications each have associated therewith colorant-dependent cost factors for printing and a threshold printing cost is set—comprises an input operative to receive a color image having color element specifications, a counting module operative to determine one or more colorant amounts of the color image, a cost determination module operative to calculate an actual printing cost for the image based on the one or more colorant amounts and the colorant-dependent cost factors, a threshold switch operative to determine whether and to what extent the actual printing cost exceeds the threshold printing cost, an ideal color table containing ideal color information accessed through the threshold switch when the actual printing cost does not exceed the threshold, at least one alternative color table containing modified color information accessed through the threshold switch when the actual printing cost exceeds the threshold printing cost and a print engine operative to print one of a modified color image based on the modified color information of the alternative color table and the color image based on the ideal color information of the ideal color table.

In another aspect of the invention, a system includes means for providing a color image having color pixels, a means for determining a number of the color pixels of the color image, a means for calculating an actual printing cost for the image based on the number of color pixels and a pixel cost, a means for determining whether the actual printing cost exceeds a threshold printing cost, a means for reducing the one or more colorant amounts to be used in printing if the actual printing cost exceeds the threshold, and a means for printing either a modified color image based on the reducing or the color image.

In another aspect of the invention, the invention is implemented in a xerographic printing environment.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

The present invention exists in the construction, arrangement, and combination of the various parts of the device and the steps of the method as will be described, and as are specifically pointed out in the claims, and illustrated in the accompanying drawings, in which:

Figure 1:
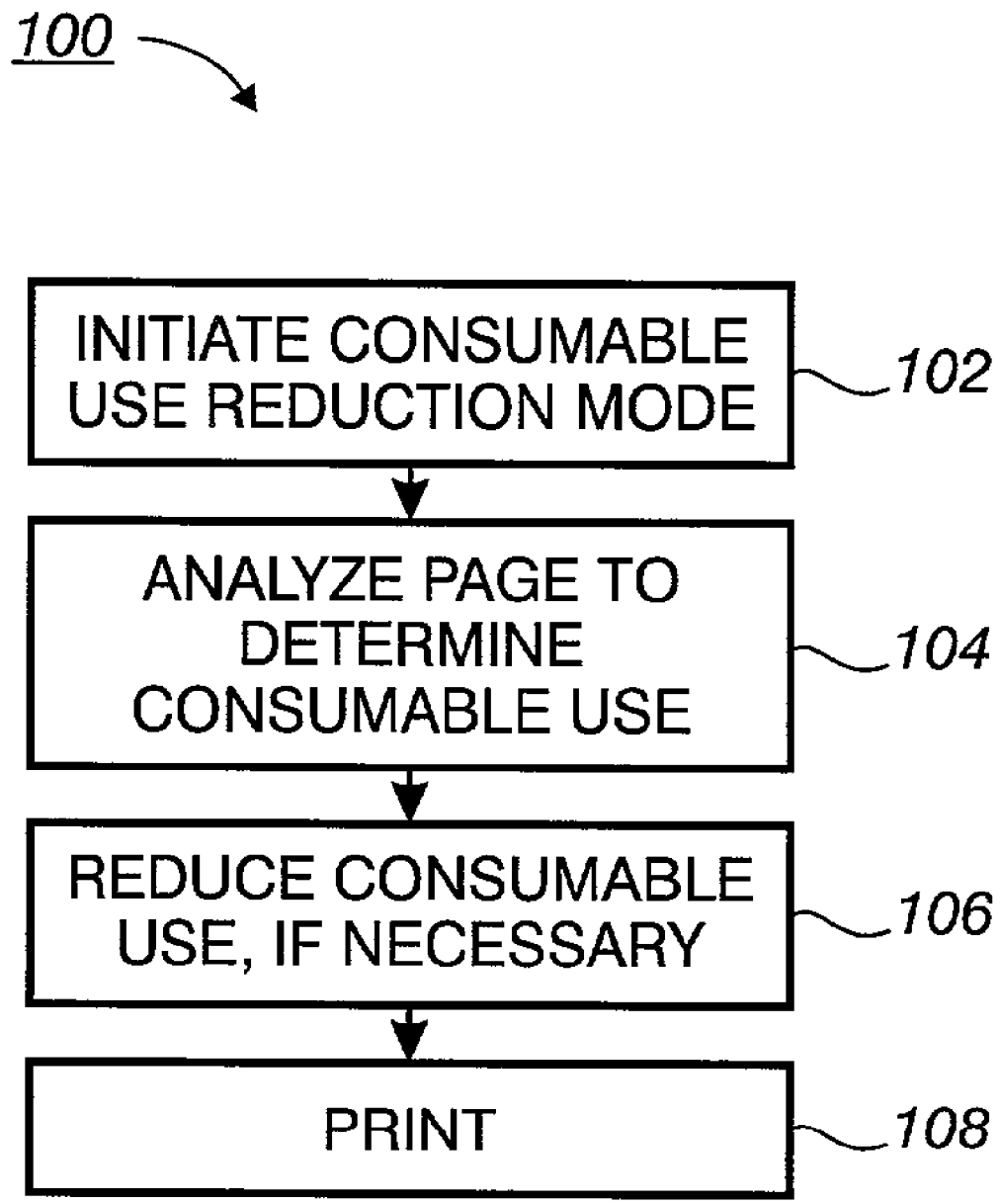
FIG. 1 is a flow chart illustrating an overall method according to the present invention.

Referring now to the drawings wherein the illustrations are for purposes of showing embodiments of the invention only and not for purposes of limiting the invention, FIG. 1 provides a view of an overall preferred method according to the present invention that may be implemented in a suitable image rendering device, such as a copier or printer. As shown, the overall method 100 includes initiating a consumable use reduction mode for the rendering device (step 102) and then analyzing a page to determine the estimated use of the consumable for printing thereof (step 104). If necessary, the consumable use for the page is reduced for printing purposes (step 106). The page is then printed (step 108).

It should be appreciated that, although the overall preferred method is described in connection with reduction of consumable use as performed on a page-by-page basis, the invention could also be applied on a document-by-document basis. This alternative could be implemented in situations where entire documents are available for analysis prior to printing. For example, in such a situation, a heavily-colored page might print as requested, provided that the document contains pages having low consumable use, to compensate for the consumables necessary to produce the heavily-colored page.

As noted above, it should be further appreciated that the invention is not limited to the printing of color pages with toner or ink. The techniques described herein could also be applied where printing is accomplished with other image rendering materials (e.g. texture-building materials) that vary in cost.

Figure 2:
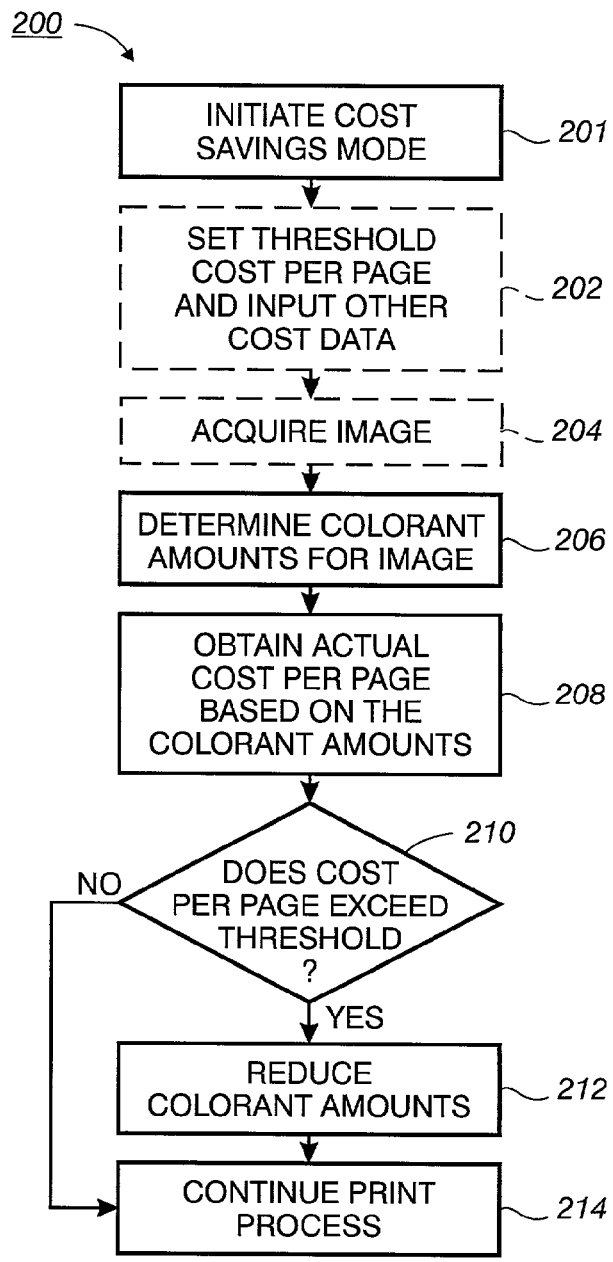
FIG. 2 is a flow chart illustrating a more detailed method according to the present invention.

Referring now to the drawings, in a preferred embodiment of the invention shown in FIG. 2, a method 200 is implemented by first initiating a cost saving mode for the image rendering device (step 201). Of course, at least in the initial run or prior thereto, the threshold cost per page is set (step 202), the surpassing of which will cause the features of the present invention to be implemented to save costs. For practical purposes, the initiation of the cost saving mode may be an input made only by the administrator of the rendering device as opposed to all users. Such a feature could readily be implemented in conjunction with a required use of security passwords and the like.

In addition, other consumable use data, such as the cost of consumable materials for printing or rendering, as well as other consumable use factors such as energy use, machine wear, and the like, is input to the system. In one embodiment this is expressed as a cost per color element, or pixel, and is a function of its color (e.g. the colorant amount assigned to the pixel.) In another embodiment this is expressed as a cost per colored area size and is a function of the color. This cost could be determined and set when the device is configured. Alternatively, the cost could be determined and input to the system by the administrator, similar to the manner in which the administrator would input the threshold cost per page. This alternative would, of course, provide improved flexibility in the event that printing materials (or the cost thereof) deviate from the time of initial configuration of the device. The cost per pixel could thus be periodically updated. Again, for practical purposes, in a system where the cost per pixel may be changed, such a change is preferably only made by the administrator of the system, as opposed to all users.

As further shown, the method includes acquiring an image (step 204) and determining one or more colorant amounts estimated for use (for example, by counting the pixels for which a colorant amount is assigned) in printing that image (step 206). The step of scanning is used to acquire the image in copy devices. However, in printers, scanning is not necessary. The image to be printed may be acquired over a network or from a workstation, and simply requires sufficient analysis to determine the colorant amount. Typically, an acquired image is comprised of a plurality of color elements (e.g. color pixels) for which color element specifications, such as pixel colors, are designated. However, the acquired image may alternatively be described by a collection of drawing primitives for which the color specification and area to be colored can be determined.

Once the one or more colorant amounts in an image are obtained, one or more colorant amounts are multiplied by the respective colorant dependent cost factors and totaled over all color element specifications to obtain an estimated cost per page (step 208). In the embodiment wherein the cost data is a cost per pixel, the number of pixels in the image for which color (or colorant) amounts are assigned is simply multiplied by the cost per pixel. It should be apparent that the invention is preferably implemented in a digital environment where pixel based analyses is common. However, the present invention is not so limited. The invention may be applied in any environment, digital or otherwise, where the colorant amount for a page can be determined and a cost per page can be calculated prior to the actual printing of the page.

A determination is then made whether the cost per page exceeds the threshold set in step 202 (step 210). If not, the print process is simply continued to print the color image (step 214). If the cost per page that is calculated in step 208 exceeds the threshold, then one or more colorant amounts to be ultimately used in printing are reduced (step 212). Once the one or more colorant amounts are reduced, the print process is simply continued, as those skilled in the art will appreciate (step 214).

It should be understood that step 212 for reducing one or more colorant amounts may be realized in a number of different techniques. For example, referring now to FIG. 3, a method 300 for reducing one or more colorant amounts in the system according to the present invention is illustrated. As shown, the step of reducing one or more colorant amounts is initiated (step 302) and then an alternative color table is selected (step 304). The color table is used to map the requested colors (or one or more colorant amounts) to new colorant values. Such color table techniques are well-known components of color management systems.

Such an alternative color table preferably includes colors for which saturation levels are adjusted (e.g. reduced) as compared to the ideal color table of the system that is used in typical color printing applications. Alternatively, the alternative color table could shift the hue of colors from secondary to primary colors that require only one colorant (not two) to produce a rendering. As will be appreciated, colors in such an ideal color table are specified for an image as Page Description Language (PDL) values, scanner values, or streaming data values. Reducing the saturation levels of these colors in the alternative color table will result in less color ink being required for printing. As such, printing costs are reduced.

Figure 3:
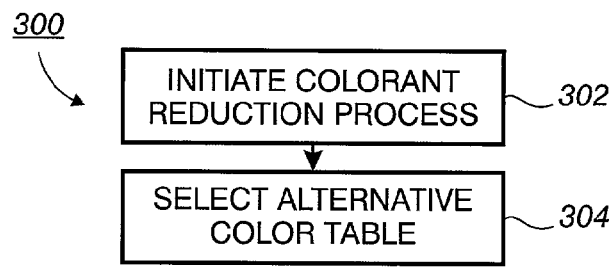
FIG. 3 is a flow chart illustrating a method to reduce one or more colorant amounts.
Figure 4:
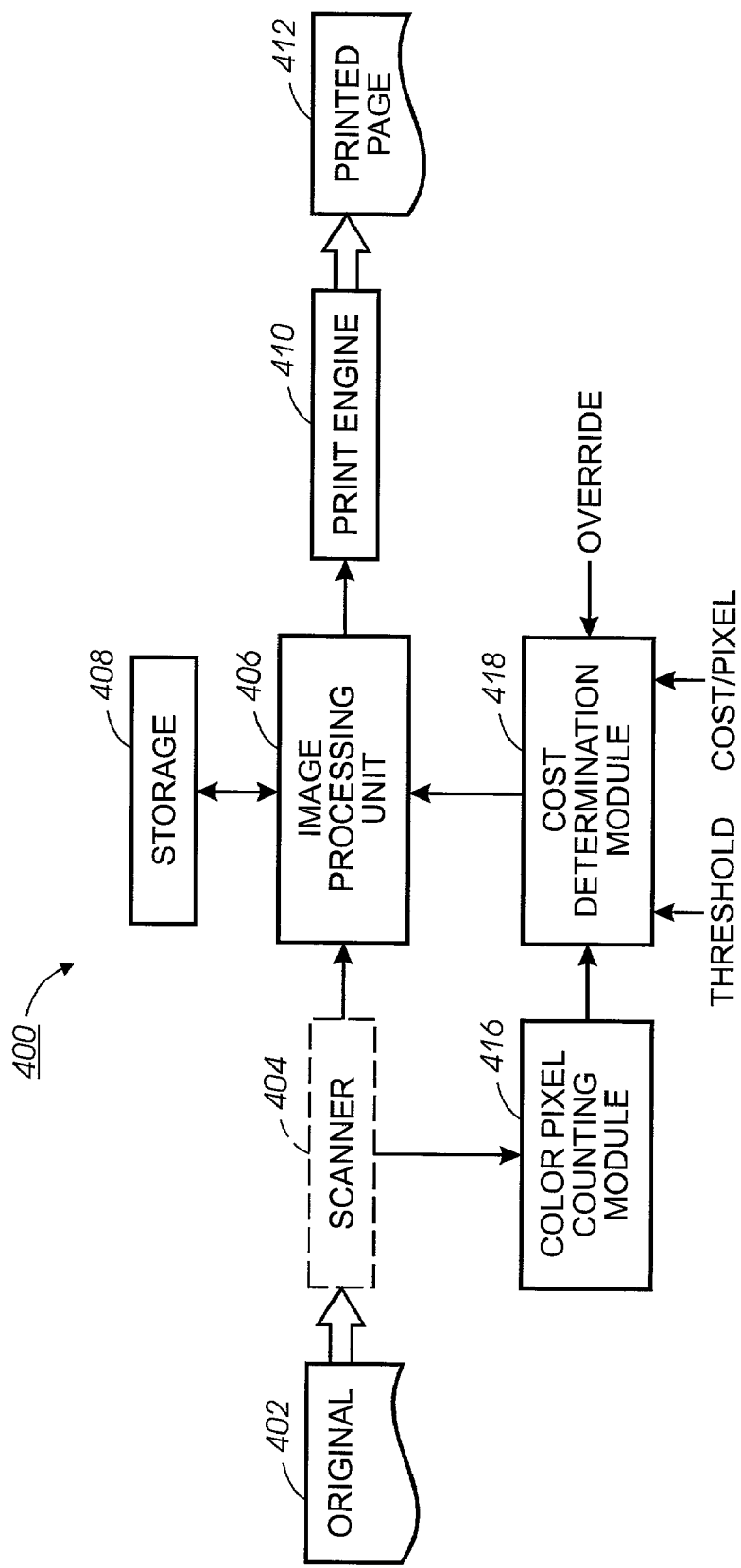
FIG. 4 is a block diagram of an apparatus according to the present invention.

Referring now to FIG. 4, a system for implementing an embodiment of the method of FIGS. 1–3 is illustrated. As shown, the system 400 includes a scanner 404 which receives an original image 402. The scanner inputs rasterized data to an image processing unit 406 which is also in communication with a storage device 408. In cases where a scanner is not used, a digital image is simply provided to the image processing unit and a module 416 using known techniques in digital printing. The image processing unit 406 has an output connected to a print engine 410 which ultimately outputs a printed page 412. Preferably, the print engine 410 is a xerographic print engine that operates in a xerographic printing environment. The printing environment is preferably a digital printing environment but may also be of other types. Moreover, xerographic print engines and xerographic printing environments includes structures and functions that are well known in the printing field.

Significantly, in the embodiment shown, the scanner 404 is also connected to a color pixel counting module 416 which outputs information to a cost determination module 418. The color pixel counting module counts the pixels of the image that require or have assigned colorant amounts associated with rendering. The cost determination 418 accepts, as inputs, first and second data representing the threshold information and cost per pixel information, respectively, and determines whether the cost for printing the page being analyzed exceeds the threshold. In the preferred embodiment, this determination is simply a calculation comprising multiplying the cost per pixel by the number of pixels counted. That result is then compared to the threshold. The result of this determination is then fed to the image processing unit 406. It should be recognized that, although the module 416 is preferably a color pixel counting module that counts, in the image, the color elements (e.g. color pixels) that have a colorant amount assigned to it or required by it for printing an image, the module could take any suitable form to determine the colorant amounts that will be required by the image for rendering. The module 416 is thus not limited to a pixel counting module. Likewise, although the cost determination module 418 accepts a cost per pixel as an input and performs appropriate calculations using such data (as well as the pixel count), the module could alternatively accept any data on the colorant amounts of the image and any cost data, examples of which are described above, that conform to the specific embodiment being implemented. Of course, the calculations would vary depending on the nature of the cost data that is input.

The cost determination module 418 also accepts, as an input, third data for effecting an override mode to circumvent the consumable use reduction feature described herein. For example, a determination of the presence of the override mode causes one or more color images to be rendered without implementation of page cost reduction. In the illustrated embodiment, the override mode may thus be used to suspend the cost analysis and cost reduction steps 104 and 106 for a defined number of pages, documents, or for a period of time. Hence, while the image rendering device is in the override mode, a selected page or pages, or one or more complete documents, could be rendered without implementation of the cost reduction feature described herein.

For practical purposes, the availability of the override mode (for selective operation of the cost reduction feature) may be controlled by the administrator, and hence could be reserved for use only by the administrator or by certain key operators, or could be made available to password-enabled users, or to all users of the image rendering device. The override mode, its duration, and its availability could readily be implemented according to inputs by the user or administrator and in conjunction with a required use of a permission device such as a keycode, security password, user identification, and the like. For example, a password could be used to override one or more restrictions pertinent to the cost reduction feature. The availability of the override mode could be user-dependant (e.g., permission is granted automatically to certain individual users when submitting jobs across a network, or to one or more especially identifiable users); value-dependant (e.g., the system is receptive to permission devices which are activated according to deductions from a debit or charge account); time-dependent (e.g., the system is receptive to permission devices during limited hours of operation); or could be status-dependent (e.g. the system is receptive to permission devices only during periods of low demand or infrequent operation.) Permission to override may also be restricted to allow only a limited number of pages or documents to be produced before the consumable use reduction mode is activated.

Figure 5:
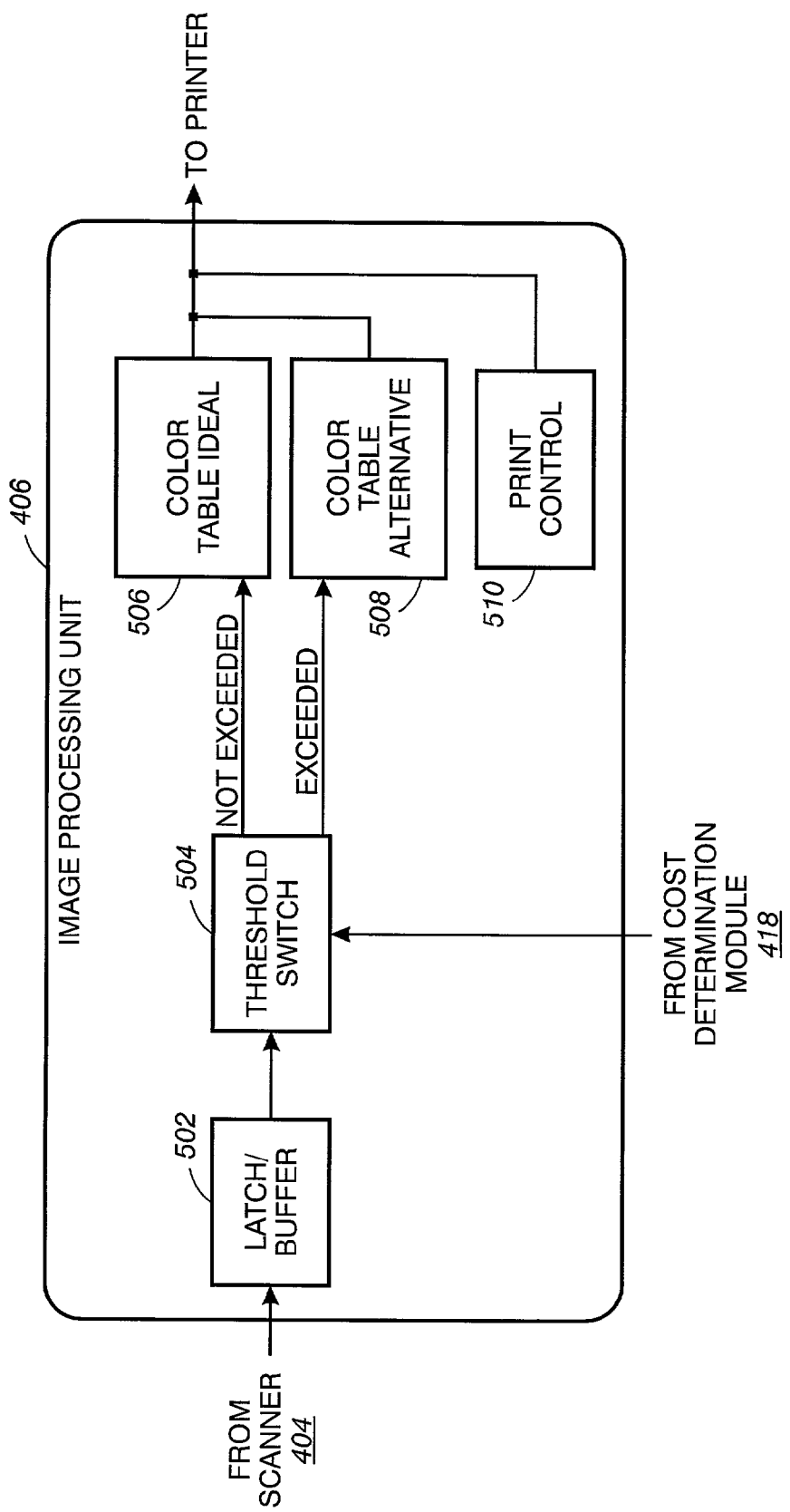
FIG. 5 is a block diagram of an image processing unit according to the present invention.

With reference now to FIG. 5, the image processing unit 406 in a preferred form is shown. A latch or buffer 502, for retaining a predefined amount of data representing the image, connects to a threshold switch 504. The switch 504 receives input from the cost determination module 418 (FIG. 4) as to whether the threshold is exceeded. If not, the image data is used to access a typical or ideal color table, color table 506, in the system to print a full color image. If the threshold is exceeded, however, the switch facilitates transfer of the image data to access the alternative color table 508, which includes color values of reduced saturation in the preferred embodiment. However, as noted above, the alternative color table could shift the hue of colors from secondary to primary colors that require only one colorant (not two) to produce a rendering. In this case, the table includes values representing the shift. A reduced color image is then printed by the print engine. Those skilled in the art will appreciate that the image processing unit 406 also includes a print control module 510.

Figure 6:
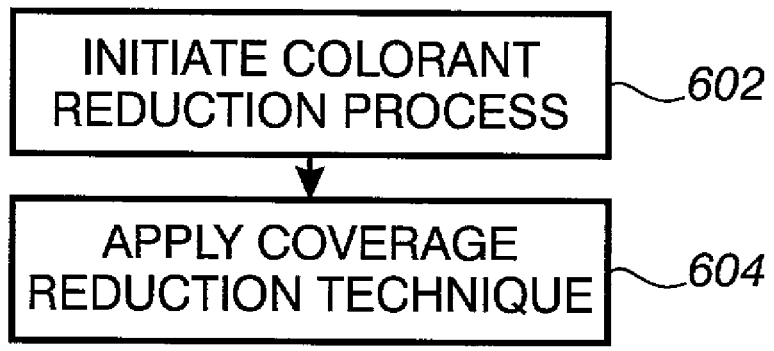
FIG. 6 is a flow chart illustrating an alternative method for reducing one or more colorant amounts according to the present invention.

In another embodiment of the present invention, the colorant amount reduction step takes a different form. With reference now to FIG. 6, the colorant reducing step includes initiation of the process (step 602) and then implementation of at least one of a variety of coverage area reduction processes (step 604). These processes are described in commonly assigned U.S. Pat. No. 5,635,967 to Klassen entitled "Image Processing Method To Reduce Marking Material Coverage And Printing Processes", U.S. Pat. No. 5,519,815 to Klassen entitled "Image Processing Method To Reduce Marking Material Coverage And Printing Processes", and U.S. Pat. No. 6,081,340 to Klassen entitled "Image Processing Method To Reduce Marking Material Coverage With Non-Linear Specifications", all of which are incorporated herein by reference. A still further color reducing method that could be implemented in connection with the present invention is described in U.S. application Ser. No. 09/232,641, entitled "Imaging Processing Method To Reduce Marking Material Coverage And Printing Processes", which is also incorporated herein by reference.

It will be appreciated by those skilled in the art that the use of these methods is advantageous in situations where an image has already been color corrected and half-toned, if necessary, at the point where the adjustment to the amount of colorant is to be made. These coverage reduction techniques could then be used not only to reduce colorant across the entire image but also to localize colorant reduction to not desaturate the fine lines in small text, or to desaturate graphics or text having a true color border, or to simply shift secondary colors to primary hues.

In this regard, U.S. Pat. No. 5,635,967 relates to a method and apparatus for reducing marking material coverage in reproduction of edges in a half tone image. The method includes the steps of detecting edges in the image using edge filtering and reducing the marking material coverage at the detected edges.

U.S. Pat. No. 5,509,815 relates to a device for processing color images wherein a method of reducing marking material coverage in text and line art is implemented. The method includes the steps of determining the locations of text and line art color pixels having excessive marking material coverage, processing separation pixels to turn off a predetermined portion of the separation pixels corresponding to color pixels having excessive marking material coverage (upon determining the locations of the color pixels having excessive marking material coverage), and processing a given area of separation pixels in an order which tends to randomize the turn off effect to prevent artifacts from occurring in the pixel reduction step.

U.S. Pat. No. 6,081,340 relates to a printing system for printing images including a system to reduce marking material coverage. In this system, color fidelity is maintained. The system includes an image input where the image defines an amount of marking material to be deposited on a printed reproduction, a marking material coverage calculated for determining expected original marking material coverage for a given area of a received image, and a marking material reduction controller for using the expected marking material determination to control coverage and reduce production of the given area in accordance with a nonlinear coverage reduction function.

U.S. application Ser. No. 09/232,641 discloses a method for processing a color image for printing and reduces an amount of marking material used in the printed image. The method includes the steps of measuring a marking material coverage value over a given area within the image for each separation bit map, summing the marking material coverage of each separation bit map to determine measured marking material coverage, comparing desired marking material coverage with measured total marking material coverage to derive an on/off ratio where the on/off ratio represents a number of pixels to be turned off compared to the number of pixels at the separation, setting a number of pixels to off in a non-black color separation bit map, retaining an on/off state of all the pixels in the black color separation irrespective of the on/off ratio, and outputting the separation bit maps to a print controller.

Figure 7:
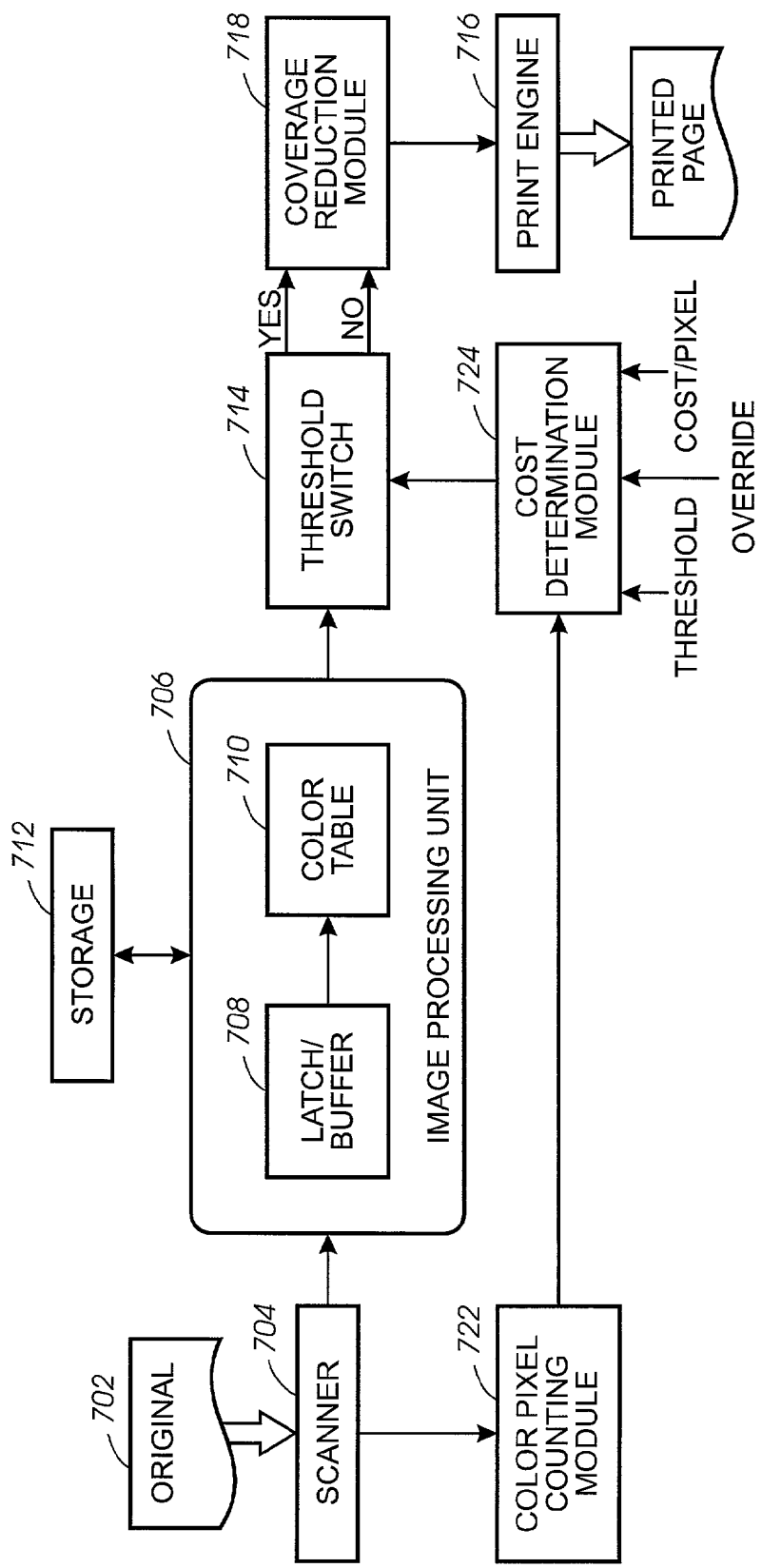
FIG. 7 is a block diagram illustrating an alternative embodiment of the present invention; and, FIG. 8 is a flow chart illustrating another alternative method for reducing one or more colorant amounts according to the present invention.

Referring now to FIG. 7, a system incorporating the colorant reduction techniques of FIG. 6 is shown. An original image 702 is received by a scanner 704 which provides rasterized image data to an image processing unit 706. The image processing unit 706 includes a latch or buffer 708 and an ideal color table 710. The image processing unit 706 also has access to and communicates with a storage device 712. The output of the image processing unit is connected to a threshold switch 714 having outputs connected to a print engine 716 and a coverage reduction module 718. In addition, the scanner 704 feeds data to a color pixel counting module 722 which, in turn, has an output connected to a cost determination module 724. The color pixel counting module counts the pixels of the image that require or have assigned colorant amounts associated with rendering. The output of cost determination module 724 is received by a threshold switch 714. In the preferred embodiment, this determination is simply a calculation comprising multiplying the cost per pixel by the number of pixels counted. That result is then compared to the threshold. As will be appreciated, if the threshold cost for a printed page is not exceeded, a printed page is simply printed in full color according to the colors specified in the color table 710. If, however, threshold cost for a printed page is exceeded, the coverage reduction module implements coverage reduction techniques as described above and then prints the page based thereon.

Preferably, the print engine 716 is a xerographic print engine that operates in a xerographic printing environment. The printing environment is preferably a digital printing environment but may also be of other types. Moreover, xerographic print engines and xerographic printing environments includes structures and functions that are well known in the printing field.

It should be recognized that, although the module 722 is preferably a color pixel counting module that counts, in the image, the color elements (e.g. color pixels) that have a colorant amount assigned to it or required by it for printing an image, the module could take any suitable form to determine the colorant amounts that will be required by the image for rendering. The module 722 is thus not limited to a pixel counting module. Likewise, although the cost determination module 724 accepts a cost per pixel as an input and performs appropriate calculations using such data (as well as the pixel count), the module could alternatively accept any data on the colorant amounts of the image and any cost data, examples of which are described above, that conform to the specific embodiment being implemented. Of course, the calculations would vary depending on the nature of the cost data that is input.

Note that some coverage reduction methods allow continuously selectable reduction amounts. Note also that a plurality of color reduction tables could be employed in any of the described embodiments. If these techniques are used, then the threshold switch (504 or 714) is generalized, as those of skill in the art will appreciate, to provide the appropriate table selection or reduction value.

Figure 8:
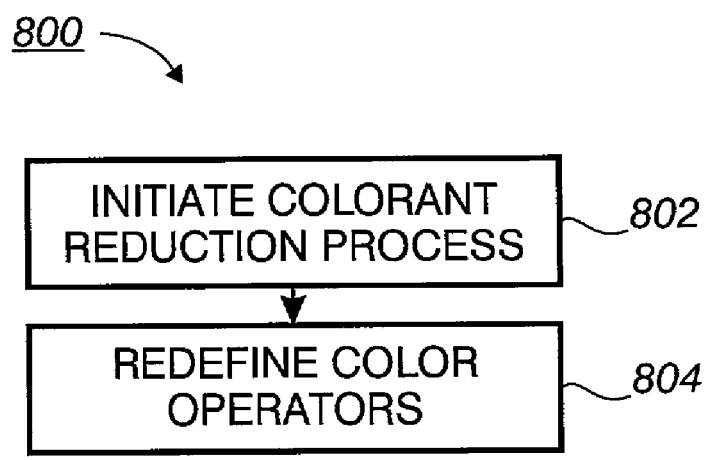

Still a further alternative for reducing one or more colorant amounts is provided by the present invention. Referring now to FIG. 8, a method 800 for reducing one or more colorant amounts is shown. This process is initiated (step 802) and then color operators are redefined (step 804). Images can be described as a sequence of imaging operation specifications that establish the color to use and describe the shape to be drawn as elements of the image. An imaging operator can be redefined such that when that operator is evoked with a color specification, it reduces that color specification prior to establishing it as the color used in drawing. It should be understood that this process has particular advantages if the analysis of the present invention is conducted in the print driver and the page is in a PostScript format since the PostScript language supports such a redefinition of operators.

It should be appreciated that while page coloring can be limited according to the present invention, reduction to a cost that is less than the cost of a black and white page may be impractical. It would, however, be possible to also reduce the cost of a completely neutral page by increasing the lightness (reducing the amount of black ink used). It is to be still further appreciated that coloring cost analyses performed according to the present invention could also be collected and made available to a system administrator. A system administrator could then monitor the characteristics of the pages being printed.

Of course, the invention as described in connection with FIGS. 1–5 is particularly well-suited for color reduction of an entire page prior to rendering. However, it is to be understood that the invention may also be applied to circumstances where it is desirable to reduce one or more colorant amounts differently on different parts of the image, or for different types of image elements. For example, image elements such as graphics or photographs within a page may be color reduced, or reduced in size (according to, for example, a selectable, predefined, or variable image element size reduction ratio, such as 50%), or converted to black-and-white upon rendering. However, text and other graphics may retain color of original or reduced form. Such an embodiment of the invention would preferably consider color specifications at the object level rather than pixel level. Alternatively, the teachings of the above referenced patents and application on the known coverage reduction techniques could be employed to implement such a variation of the invention. For example, the determination of edges and lines would be useful in this regard.

It is to be understood that in the foregoing method for page cost reduction, the particular technique employed for the colorant amount reduction (in step 212) such as the selection of one or more coverage area reduction processes (in step 604) may be configured by the system administrator, or by the user according to input data provided prior to or during the page rendering operation. For example, the configuration may be accomplished according to data inputted by the user and conveyed to, or stored in, the image processing unit 406, 706 or to the coverage reduction module 718. Such configuration may also be the result of a combination of one or more settings provided by the system administrator and one or more selections made by the user.

It is to be understood that the present invention may be implemented using suitable hardware and software techniques. Such implementation should be apparent to those of skill in the field upon a reading of this disclosure. In addition, alternative hardware and software techniques may be used in appropriate circumstances to implement the invention.

As mentioned above, the invention finds particular application in a xerographic printing, or copying, environment using a xerographic print engine for rendering purposes. However, the invention may be applied in any image rendering system.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

What is claimed is:

1. A method for controlling consumable use in an image-rendering device, wherein images rendered are represented in the device by use of a consumable material having a consumable element specification, the consumable element having associated therewith a use factor for printing that is dependent on the particular associated consumable and amounts thereof, for which a threshold may be set, the method comprising:

determining the presence of an optional override mode;
in the presence of the override mode, rendering the image without implementation of at least one consumable reduction technique, and in the absence of the override mode, rendering the image with implementation at least one consumable reduction technique, so as to reduce use of the consumable material, according to the following steps:
(a) providing an image having an associated consumable element specification;
(b) determining at least one consumable material amount of the image;
(c) determining the estimated consumable material use for the image based on the consumable material amount and its associated use factor;
(d) determining whether the estimated material use exceeds the threshold;
(e) if the estimated material consumption exceeds the threshold, reducing the consumable material amount to be used in rendering the image according to the consumable amount reduction technique, so as to provide a modified image; and
(f) rendering the modified image.

2. The method as set forth in claim 1 wherein the determination of consumable use is performed on a page-by-page basis.

3. The method as set forth in claim 1 wherein the determination of consumable use is performed on a document-by-document basis.

4. The method as set forth in claim 1 wherein the technique for reducing the consumable amount is selectably configured according to input data.

5. The method as set forth in claim 1 wherein the presence of the override mode is controlled in conjunction with use of a permission device.

6. A method for controlling page cost in an image rendering device, wherein images rendered are represented in the device by color elements having color element specifications, the color elements each having associated therewith cost factors for printing that are dependent on particular associated colorants and amounts thereof, for which a threshold printing cost may be set, the method comprising:

determining the presence of an optional override mode, and in the presence of the override mode, rendering the color image without implementation of page cost reduction, and in the absence of the override mode, rendering the color image with implementation page cost reduction, according to the following steps:

(a) providing a color image having color element specifications;
(b) determining at least one colorant amount of the color image;
(c) calculating a printing cost for the image based on the colorant amount and a respective colorant dependant cost factor;
(d) determining whether the printing cost exceeds the threshold printing cost;
(e) if the printing cost exceeds the threshold printing cost, reducing the colorant amount to be used in rendering the color image according to a colorant reduction technique so as to provide a modified color image; and,
(f) rendering the modified color image.

7. The method as set forth in claim 6 wherein the presence of the override mode is determined according to a password.

8. The method as set forth in claim 6 wherein the color element specifications are pixel colors.

9. The method as set forth in claim 6 wherein the step for providing a color image comprises scanning the color image.

10. The method as set forth in claim 6 wherein the step for calculating comprises multiplying a plurality of colorant amounts by the respective colorant-dependent cost factors and achieving a sum total according to a plurality of the color element specifications.

11. The method as set forth in claim 6 wherein the technique for reducing the colorant amount comprises selecting an alternative color table.

12. The method as set forth in claim 6 wherein the technique for reducing the colorant amount comprises applying a coverage reduction technique.

13. The method as set forth in claim 6 wherein the technique for reducing the colorant amount comprises redefining a color operator.

14. The method as set forth in claim 6 wherein the technique for reducing the colorant amount comprises reducing the size of an image element in the color image.

15. The method as set forth in claim 6 wherein the technique for reducing the colorant amount is selectably configured according to input data.

16. The method as set forth in claim 6 wherein the presence of the override mode is controlled in conjunction with use of a permission device.

17. The method as set forth in claim 6 wherein the method is implemented in a xerographic printing environment.

18. An image rendering system wherein images rendered are represented in the device by color element specifications, the color element specifications each having associated therewith colorant-dependent cost factors for printing, and wherein a threshold printing cost may be set, the system comprising: an input operative to receive a color image having color element specifications; a counting module operative to determine at least one colorant amount of the color image; a cost determination module operative to calculate an actual printing cost for the image based on the colorant amount and the respective colorant-dependent cost factor; a threshold switch operative to determine whether and to what extent the actual printing cost exceeds the threshold printing cost; an image processing unit operative, upon a determination that the actual printing cost exceeds the threshold printing cost, to reduce the colorant amount to be used in rendering the color image according to a colorant amount reduction technique so as to provide a modified color image; a print engine operative to print the modified color image when present, and if not, the color image; wherein at least one of the cost determination module and the image processing unit is responsive to the presence of an optional override mode, and in the presence of the override mode causes the color image to be rendered without implementation of page cost reduction, and in the absence of the override mode causes the modified color image to be rendered thereby affording a reduction in page cost.

19. The system as set forth in claim 18 further comprising a scanner.

20. The system as set forth in claim 18 wherein the threshold switch, an ideal color table, and an at least one alternative color table are included in the image processing unit; wherein the ideal color table contains ideal color information accessed through the threshold switch when the actual printing cost does not exceed the threshold, and the alternative color table contains modified color information accessed through the threshold switch when the actual printing cost exceeds the threshold printing cost.

21. The system as set forth in claim 20 wherein the modified color information of the alternative color table includes ideal colors having hues shifted from secondary to primary colors.

22. The system as set forth in claim 20 wherein the modified color information of the alternative color table includes ideal colors having reduced saturation levels.

23. The system as set forth in claim 18 wherein the reduction of the colorant amount comprises a reduction in the size of an image element in the color image.

24. The system as set forth in claim 18 wherein the colorant amount reduction technique is selectably configured according to input data.

25. The system as set forth in claim 18 wherein the presence of the override mode is controlled in conjunction with use of a permission device.

26. The system as set forth in claim 18 wherein the print engine comprises a xerographic print engine.

27. An image rendering system wherein images rendered are represented by pixels, the pixels each have associated therewith a pixel cost for printing and wherein a threshold printing cost is set, the system comprising:
means for providing a color image having color pixels;
means for determining a number of the color pixels of the color image;
means for calculating a printing cost for the image based on the number of color pixels and the pixel cost;
means for determining whether the printing cost exceeds the threshold printing cost;
means for reducing a colorant amount to provide a modified color image to be used in printing if the printing cost exceeds the threshold printing cost;
means for printing the modified color image when present, and if not, the color image; and
means for determining the presence of an optional override mode, wherein the presence of the override mode causes the color image to be rendered without implementation of page cost reduction, and in the absence of the override mode causes the modified color image to be rendered thereby affording a reduction in page cost.

28. The system as set forth in claim 27 wherein the providing means comprises a scanner.

29. The system as set forth in claim 27 wherein the calculating means comprises a means for multiplying the number of color pixels by the pixel cost.

30. The system as set forth in claim 27 wherein the means for reducing the colorant amount comprises an alternative color table.

31. The system as set forth in claim 27 wherein the means for reducing the colorant amount comprises means for applying a coverage reduction technique.

32. The system as set forth in claim 27 wherein the means for reducing the colorant amount comprises means for redefining a color operator.

33. The system as set forth in claim 27 wherein the means for reducing the colorant amount comprises means for reducing the size of an image element in the color image.

34. The system as set forth in claim 27 wherein the means for reducing the colorant amount is configurable according to input data.

35. The system as set forth in claim 27 wherein the presence of the override mode is controlled in conjunction with use of a permission device.

* * * * *